United States Patent [19]

Grendol

[11] Patent Number: 4,540,534
[45] Date of Patent: Sep. 10, 1985

[54] APPARATUS AND METHOD FOR INJECTION MOLDING LENSES

[75] Inventor: Clark L. Grendol, Sturbridge, Mass.

[73] Assignee: American Optical Corporation, Southbridge, Mass.

[21] Appl. No.: 540,867

[22] Filed: Oct. 11, 1983

[51] Int. Cl.³ .................................................. B29D 11/00
[52] U.S. Cl. ........................................ 264/2.2; 249/82; 264/328.7; 264/328.9; 264/328.12; 425/352; 425/547; 425/555; 425/558; 425/561; 425/562; 425/563; 425/808
[58] Field of Search .................... 264/2.2, 328.7, 328.9, 264/328.12; 425/808, 547, 555, 558, 561, 562, 563, 352; 249/82

[56] References Cited

U.S. PATENT DOCUMENTS

| | | | |
|---|---|---|---|
| 2,166,215 | 7/1939 | Lloyd | 425/808 X |
| 2,233,057 | 2/1941 | Luce | 425/808 X |
| 2,319,014 | 5/1943 | Smith | 425/808 X |
| 2,333,131 | 11/1943 | Tillyer et al. | 425/808 X |
| 2,516,373 | 7/1950 | Ehlert et al. | 264/1 X |
| 2,532,501 | 12/1950 | Johnson | 425/808 X |
| 3,240,854 | 3/1966 | Ewer | 264/1 |
| 3,902,693 | 9/1975 | Crandon et al. | 425/808 |
| 4,008,031 | 2/1977 | Weber | 425/242 R |
| 4,091,057 | 5/1978 | Weber | 264/1 |
| 4,184,835 | 1/1980 | Talbot | 425/577 |
| 4,254,065 | 3/1981 | Ratkowski | 425/808 |
| 4,364,878 | 12/1982 | Laliberte | 425/808 |

FOREIGN PATENT DOCUMENTS

| | | | |
|---|---|---|---|
| 597171 | 5/1960 | Canada | 264/1 |
| 57-70617 | 5/1982 | Japan | 264/2.1 |

Primary Examiner—James Lowe
Attorney, Agent, or Firm—Pahl, Lorusso & Loud

[57] ABSTRACT

An apparatus and method for molding polycarbonate lenses is disclosed in which the lenses are formed in a single injection molding operation. Polycarbonate is injected into a cavity between two movable dies which are forced apart by the injected polycarbonate. These dies are then urged together forcing a portion of the injected polycarbonate back through the same port through which the polycarbonate was injected. The finished lens does not have the knit line normally associated with injection molded lenses.

27 Claims, 8 Drawing Figures

APPARATUS AND METHOD FOR INJECTION MOLDING LENSES

BACKGROUND OF THE INVENTION

This invention relates to lens molding and more particularly to injection molding apparatuses and techniques.

There have been several attempts, in the prior art, to mold both plus and minus polycarbonate ophthalmic lenses. Minus lenses are lenses that are thinner in their center and thicker along their edges, and plus lenses are lenses that are thicker in their center and thinner along their edges.

Methods and apparatuses for molding lenses have utilized both compression and injection molding techniques as well as a combination of the two. One problem frequently associated with injection molding of lenses is that the lenses produced often contain a knit line. The manner in which this knit line is formed is described below with reference to FIGS. 1a-1d.

Referring first to FIG. 1a, a cavity 29 of an injection molding apparatus is illustrated which includes an inlet 28. The injected molten plastic 35 is illustrated as the plastic first enters the cavity 29. Assume for sake of discussion that the lens being fabricated within cavity 29 has a thinner center 33, such center being thinner than the outer edge of the lens. As the plastic 35 enters the cavity 29 it tends to flow to the outer perimeter of the cavity 29, since the cavity is thicker in this region. In FIG. 1b the plastic 35 is again illustrated as it continues to fill the cavity 29. As may be seen in this figure, the plastic 35 does not immediately flow into the thinner center 33 of the cavity 29 but rather continues to advance about the outer rim of the cavity. In FIG. 1c the continued flow of the plastic 35 is illustrated, however, in this figure as may be seen, the plastic has flowed through the thinner center of the lens. As the plastic meets within the thinner center of the cavity a knit line 31 develops at the seam along which the flow meets. In FIG. 1d the cavity is illustrated completely filled with the plastic 35, and the knit line 31 which is inherent in conventional plastic flow (for any cavity having a thin center) is illustrated. This knit line prevents the use of the resultant blank as an optical lens without additional treatment, such as polishing.

Another problem associated with the formation of a lens in a single injection molding operation is that during the curing of the plastic, shrinkage occurs which results in an uneven and wavy exterior surface on the finished lens blank. Such shrinkage may also cause bubbles and other imperfections in the interior of the lens, and these defects will cause optical distortions and aberrations which are unacceptable for prescription lenses and instrument lenses.

Ideally, a lens should be produced in a single injection molding operation. As will be seen, the method and apparatus of the present invention provide for the injection molding of an optical lens which results in a finished lens blank which requires fewer finishing operations. The finished blank may be thin (approximately 1 millimeter) at its center so as to result in an optically correct, lightweight and asthetically pleasing eye glass lens which is shatter proof.

U.S. Pat. Nos. 4,088,031 and 4,091,057 disclose an apparatus and method for producing a lens in which a clear thermoplastic such as acrylic or polycarbonate is forced between the two mold halves which define the optical blank. These mold halves are forced away from each other as the cavity is filled with the molten plastic. An inner press which is disposed within the injection molding apparatus urges the mold halves together once the mold is filled to a certain level with the molten plastic. The urging of the mold halves together causes a certain amount of the molten plastic to be forced through an outlet port into a self-adjusting overflow pocket. This outlet port is spaced away from the inlet port, and there may be more than one outlet in communication with the cavity.

One problem associated with the method and apparatus utilizing transfer pockets is that additional finishing operations must be performed on the fabricated lens in order to remove the transfer pockets and the plastic that cured in the inlet port. In general, lenses would be produced at a much faster rate if these finishing operations could be reduced or eliminated.

It is therefore a principal object of the present invention to provide an apparatus and method which will produce lenses using a combination of injection and compression molding techniques in which molten plastic is injected into and compressed out of the mold through the same opening.

Another object of the invention is to provide a method and apparatus of producing an optical blank in which the lens finishing operations are kept to a minimum.

SUMMARY OF THE INVENTION

An apparatus and method is disclosed for producing a finished optical blank which may be used for an eyeglass lens or the like. The apparatus and process of the present invention is particularly adaptable for lenses which are thinner in the center, such as a concave, or double concave (minus or negative) lens, including single vision, multifocal and cylindrical lenses. The injection molding apparatus utilized in the present invention includes an inner press disposed within an outer, conventional, injection molding apparatus. The inner press includes optical inserts which define an optical lens cavity. This cavity, once filled with a clear thermoplastic, such as acrylic or polycarbonate, produces the finished lens blank. The cavity includes an inlet port into which the molten plastic is injected, in a conventional manner. One or both of the optical inserts which define the optical cavity, move so as to increase the volume (particularly the thickness) of the cavity when the molten plastic is first injected into the cavity. After the molten plastic is injected into the cavity, the inner press then urges the optical inserts together, forcing a predetermined portion of the molten plastic back through the inlet port into an overflow reservoir which communicates with the passageway leading to the inlet port.

While the apparatus and method of the present invention eliminate the knit line associated with conventional plastic flow as well as any apparatus or method in the prior art, the apparatus and method also offer the additional benefit of less required finishing since the transfer pockets do not have to be cut from the finished blank since only one port communicates with the cavity. Furthermore, the apparatus and method will still compensate for the shrinkage associated with the curing of the blank, and the resultant blank is an optically precise configuration. The process and apparatus is suitable for both plus and minus lenses.

DETAILED DESCRIPTION OF THE PREFERRED EMBODIMENT

Figure 1A:
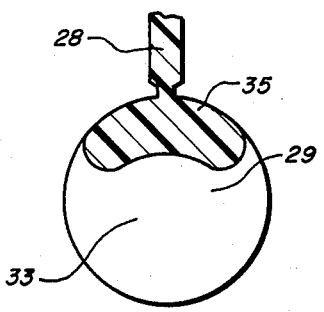
FIGS. 1a, 1b, 1c and 1d illustrate conventional plastic flow, and the formation of a knit line assoicated with such flow.
Figure 1B:
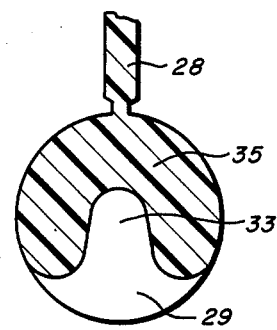
Figure 1C:
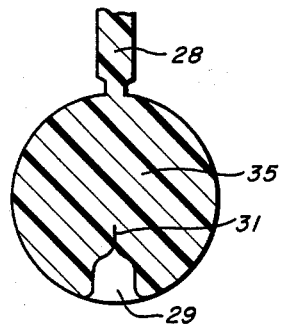
Figure 1D:
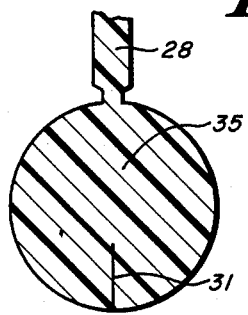

The present invention discloses an apparatus and method for fabricating a finished optical blank which blank may be utilized for eyeglasses, or the like. The resultant finished blank produced with the present invention requires little, or no, polishing and the blank may be readily cut or edged to any desired peripheral shape such that the lens may engage an eyeglass frame, instrument or the like.

Before describing the apparatus, a brief description of the finished blank 10 of FIG. 2, will be given since it will be helpful in understanding the apparatus. The finished blank 10 includes a lens area 11 which is edged to any appropriate shape, such as a shape required to fit an eyeglass frame. An annular rim 12 may be disposed about the exterior of the lens area 11 in order to facilitate the ejection of the blanks. The inlet runner or spruce 23 shows the flow of the molten plastic as it enters the cavity defining the blank 10. In the presently preferred embodiment a tip 25 is defined by the cavity; this tip allows the plus curved lens to be placed on a flat surface without scratching the bottom surface of the blank 10. Also defined by the cavity is a hanger 20. This hanger allows the finished product to be hung from a pin 21, shown in FIG. 3, or other device during subsequent processing of the finished blank 10. An overflow spruce 16 illustrates the effects of compressing the molten plastic after the plastic has entered the cavity. As will be explained, once the cavity is filled, the dies are compressed forcing or squeezing predetermined amounts of molten plastic from the cavity, back through the inlet port and into a reservoir which defines the overflow spruce 16.

Figure 4:
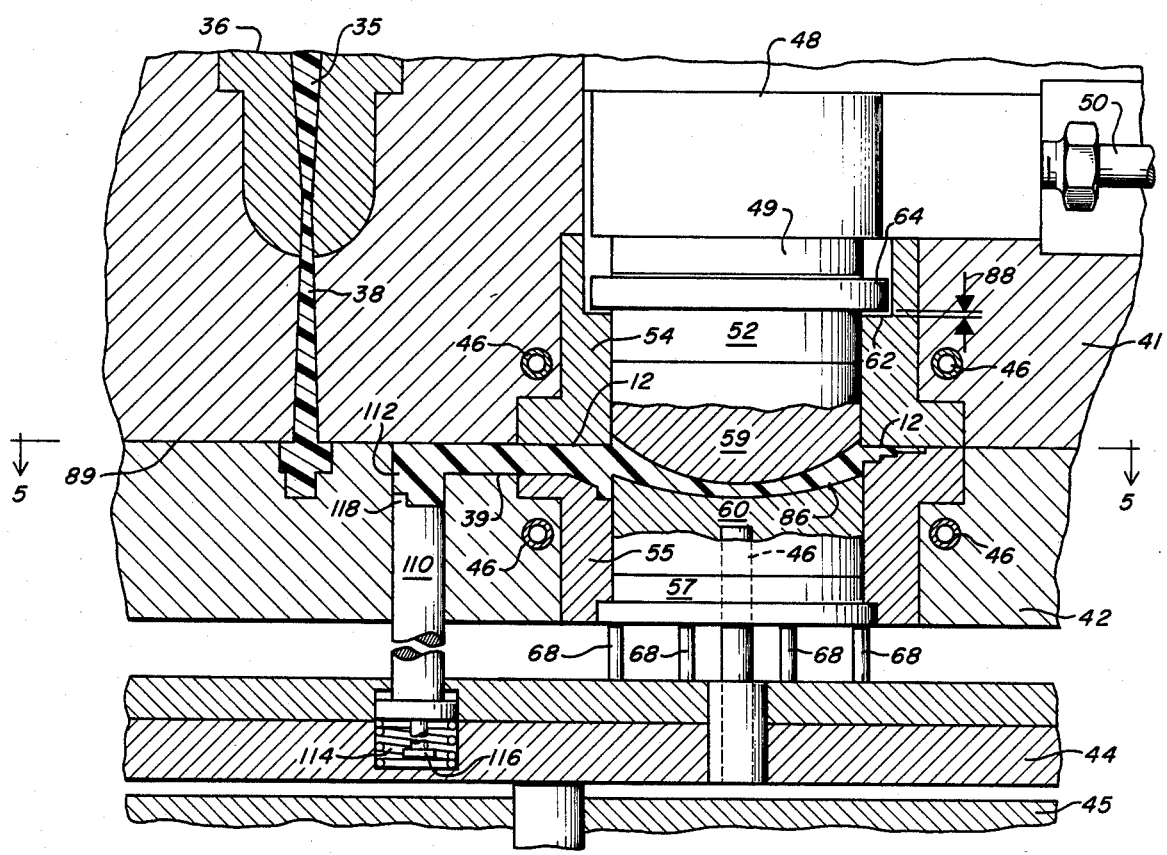
FIG. 4 is a cross sectional view of an injection molding apparatus built in accordance with the present invention.

Referring to FIG. 4, the presently preferred embodiment of the apparatus employs compression molding apparatus disposed within a conventional injection molding machine. The conventional injection molding machine includes an upper block 41 and a lower block 42 which meet at a mating surface 89. Disposed within these blocks is an injection nozzle 35 for injecting molten plastic. A plurality of heating rods 46 are disposed within these blocks (and also below the cavity 86) for heating the entire injection apparatus, including the optical inserts 59 and 60. The nozzle 35 communicates with cavity 86 through passageways 38 and 39. The blocks 41 and 42 are secured together through a hydraulic system, exerting, by way of example, a hundred tons of force.

This disclosed apparatus includes an upper interior block 54 and a lower interior block 55. Within these generally cylindrical blocks is disposed a hydraulic cylinder 48. A piston 49 which terminates in a flange 64 cooperatively engages the cylinder 48 for exerting pressure upon the plastic within cavity 86. A spacer 52 is disposed between the flange 64 and an upper optical insert or die 59. At the lower end of cavity 86 a spacer 57, supported from platform 45, is disposed directly below, and in contact with, the lower optical insert of die 60. Thus, the cavity 86 is substantially defined by the adjacent surfaces of the upper and lower dies 59 and 60. Inlet passageway 39 passes through the blocks 54 and 55 in order that the nozzle 35 communicates with the cavity 86.

A hydraulic inlet line 50 is coupled to the cylinder 48 for providing hydraulic fluid to the cylinder when the plastic contained within cavity 86 is to be compressed. The travel of the piston 49 is shown by dimension 88 of FIG. 4; this travel is limited by the distance between the flange 64 and the annulus 62 defined by the upper block 54. However, in the presently preferred embodiment, the travel of pistons 49 (and die 59) is determined by the period of time during which pressure is applied to the plastic within cavity 86 and by other means as will be discussed.

The surface of the dies 59 and 60 defining the cavity 86 are fabricated from a suitably hard metal or glass, which typically is highly polished with a precise, compensated, curve configuration in order that the finished blank has an optically clear, distortion free surface. Such optical inserts or dies are known in the prior art. Moreover, the curved surfaces of these inserts may be varied, by changing the dies 59 and 60 to obtain desired lens shapes or powers.

A plurality of ejector pins 68 may be disposed about the circumference of the cavity 86 for contacting the rim 12 of the finished blank to urge the blank from the cavity once the blank has been properly cured and the dies have been separated. These pins are coupled to the movable ejection platform 44. Standard known injection devices may be used for this application.

Communicating with the inlet passageway 39 are two pistons: a shut-off piston 100 and an overflow piston 110. Shut-off piston 100 which is disposed within cylinder 102 controls the flow of molten plastic into the cavity 86. While molten plastic flows into the cavity, the piston 100 is depressed in the cylinder 102, and when the cavity has been filled to the desired level, the piston is forced to extend from the cylinder thereby closing off the cavity 86 from further plastic flow. As will be explained later, the piston 100 will also provide a barrier for the excess plastic returning from the cavity 86 when the dies 59 and 60 are compressed.

The overflow piston 110 which is housed in cylinder 112 communicates with the inlet passageway 39 at a position between the cavity 86 and the position where the shut-off piston 100 communicates with the inlet passageway 39. While the molten plastic is flowing into the cavity 86 the overflow piston 110 is locked in a forward position thereby preventing plastic from flowing into the cylinder 112. The lower end of the overflow piston 110 is also urged upwardly by a spring 114 mounted between the lower end of the piston 110 and the ejection platform 44. An adjustable stop 116 determines the limit on the depression of the piston 110 within the cylinder 112, and when this limit is reached, the volume between the optical inserts will be that of the finished lens blank. Since there is only one port (unless the optional hanger 82 is employed in which case there are two ports) communicating with the cavity 86, the plastic must exit from the cavity 86 through the inlet port 38 where the plastic originally entered the cavity.

Figure 5:
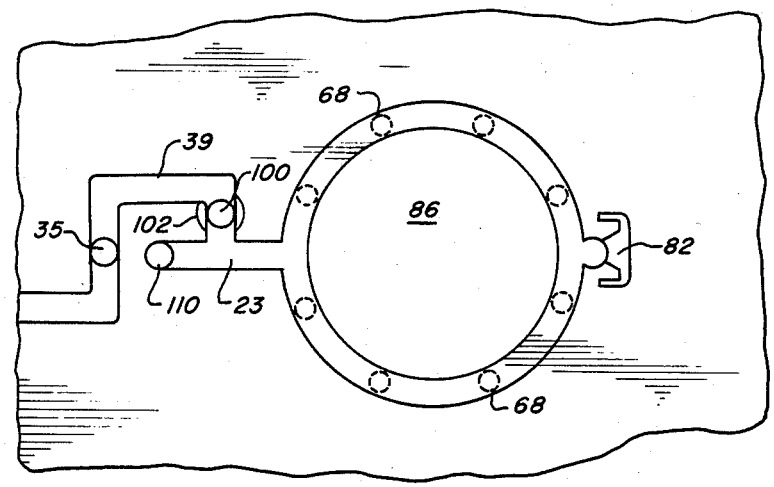
FIG. 5 is a plan view illustrating the cavity defined by the dies or optical inserts of the apparatus of FIG. 4 taken through section line 5—5 of FIG. 4.

The inlet passageway 39 as is best illustrated in FIG. 5 communicates with the cavity 86 through a right angle bend 23. This right angle (which is known in the prior art) is used to diffuse the inlet flow of molten plastic. Also illustrated in FIG. 5 is a hanger cavity or void 82 which defines the blank hanger 20 illustrated and discussed in conjunction with FIGS. 1 and 2.

The entire apparatus shown in FIGS. 4 and 5 may be readily fabricated utilizing known technology.

Assume a lens is to be fabricated on the apparatus shown in FIGS. 4 and 5, and that the desired dies 59 and 60 have been placed within the apparatus. In the presently preferred embodiment, a polycarbonate or other thermoplastic is metered into the nozzle 35 at a temperature of approximately 520° F.–560° F. Also, through use of the heating rods 46, the cavity 86 is heated to a temperature of approximately 260° F.–275° F. Prior to the injection of the molten plastic into the cavity 86 from the vessel 36, the outer blocks 41 and 42 are held secured against one another at the mating surface 89 with a force in the order of magnitude of one hundred tons.

Figure 3:
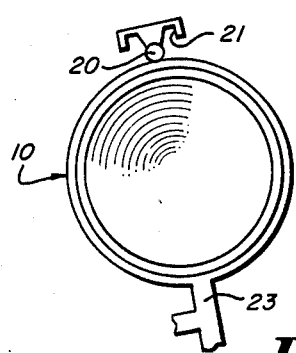
FIG. 3 illustrates the finished blank of FIG. 1 hung on a hanger which hanger is formed concurrently with the molding of the finished blank.

When the plastic is injected into the cavity 86 via passageways 38 and 39, the force of the molten plastic against the die 59 causes the die to rise, thereby increasing the volume of cavity 86 and its thickness. During this period of time, little, or no, force is exerted on die 59 through the piston 49. Since the cavity increases in volume, and particularly since the center of the cavity has a greater thickness because of the movement of die 59, the knit line described in conjunction with FIG. 3 is not formed. In the presently preferred embodiment the injection of the molten plastic into the cavity 86 takes approximately ten seconds.

Following the injection of the molten plastic into the cavity 86, hydraulic fluid is applied to the cylinder 48, through line 50, causing the upper die 59 to compress the molten plastic within cavity 86. By way of example, such pressure is exerted for a period of approximately thirty seconds with a total force of approximately twenty tons. During this period of time, molten plastic is forced from the cavity 86 back through the inlet passageway 39 where the flow is restricted by the shut-off piston 100 which isolates the cavity from the runner system. This "backing out" action further enhances the elimination of knit line by forcing a mixing of the plastic from the two flow paths.

Once the upper die 59 begins to compress the molten plastic within cavity 86, the overlow piston 110, which had been in a locked position, is released, and after a small portion of the excess plastic to be forced out of cavity exits from the cavity, the inlet passageway 39 becomes filled with plastic. As more plastic is pushed out of the cavity, the plastic already in the inlet passageway 39 exerts a force on the piston 110 forcing it to depress as the plastic fills the cylinder 112. A notch 118 along the top surface of the overflow piston 110 allows the plastic flowing into the cylinder 112 to exert an axial force against the piston 110 such that the piston 110 is forced downward against the force of the spring 114. The pressure on the die 59 causes the volume and thickness of cavity 86 to decrease, and particularly decreases the center thickness of the cavity. In this way, a lens of a desired thickness may be fabricated, including bifocal lenses.

In the presently preferred embodiment, the travel of die 59 is controlled by the length of time elapsing after molten plastic enters cavity 86 and pressure is applied to the die 59 through piston 49. Also the final volume of cavity 86 is controlled by the length of time that pressure is applied to the die 59 by piston 49. Thus, if a thinner lens is desired, a shorter period of time is allowed to lapse between the injection and application of pressure, and the pressure is maintained for a longer period of time. If a thicker lens is desired, a longer period of time is allowed to run before pressure is applied and the pressure is maintained for a shorter period of time.

Following the period of time during which the overflow or transfer occurs, the pressure is relieved from the cylinder 48 allowing a release of the pressure applied to the plastic within cavity 86. Typically, the pressure is released for two to three seconds. During this period of time the overflow back through the inlet passageway 39 ceases, since the molten plastic begins to cure. For some applications this release of pressure may not be necessary before curing begins.

Following this two or three second period of time, force (of approximately twenty tons) is again applied to the die 59. This force continues for a period of approximately two minutes, during which time the plastic within the cavity is cured. The pressure applied to the due during this period of time assures that the surface of the blank remains smooth and optically correct, since as the plastic cures it tends to shrink and pull away from the die surfaces. However, since the die is being urged against the blank, a smooth surface matching the compensated optical inserts is maintained during this curing period. The resultant blank is distortion free.

While in the disclosed embodiment the upper die 59 moves relative to the fixed lower die 60, it will be appreciated that the lower die may be moved towards a fixed upper die, or that both dies may move. Moreover, while in the disclosed embodiment, electric heating rods 46 are shown, other heating means, such as fluid heating means may be utilized to heat the apparatus. Also a vacuum exhaust may be applied to the cavity 86 prior to the time that flow begins into nozzle 35. Conventional vacuum exhaust may be used for this purpose. Cooling fluids may also be used to cool the cavity 86 during curings.

It will be appreciated that the times, temperature and forces set forth in the above example may be varied.

Also, in the presently preferred embodiment, the pressure exerted against the upper die 59 by the injected molten plastic is used to raise this die, thus increasing the volume of cavity 86. However, the die may be raised mechanically prior to the time that plastic is injected into the cavity with the same result.

Figure 2:
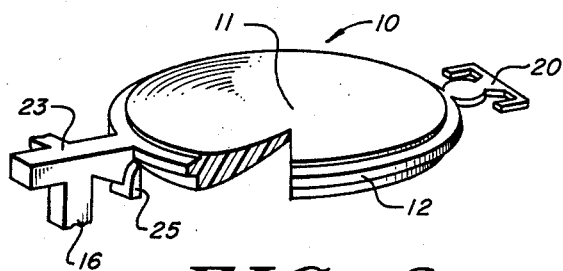
FIG. 2 is a perspective view of a finished blank produced in accordance with the present invention with a cut-away section used to illustrate the thinner center of the blank.

When the finished blank is removed from the cavity 86 its appearance is that of the finished blank 10 illustrated in FIGS. 1 and 2. This blank may then be coated with a scratch resistant coating, in a manner known in the prior art. Other known operations such as cutting, coloring, cleaning, etc. may be performed on the finished blank.

A problem similar to the knit line problem discussed in conjunction with FIGS. 1a–1d also occurs for lenses which are thinner at their outer edges than at their centers, such as large plus lenses with approximately one millimeter edge thickness. The disclosed method and apparatus may be used to solve this problem.

Thus, an apparatus and method for injection molding a lens has been disclosed. The lens is fabricated in a single injection molding operation, and unlike prior art methods, a pre-formed blank is not required. In addition, the fabricated lens requires few finishing operations to be performed on it since transfer pockets do not have to be removed from finished lens. With the disclosed apparatus many high quality ophthalmic and instrument lenses may be produced from a single injection molding apparatus, at substantially lower costs than is possible with prior art techniques and apparatuses.

What is claimed is:

1. A method for forming a thermoplastic optical lens blank in an injection molding apparatus where said apparatus includes an optical cavity for defining said optical lens blank comprising the steps of:

injecting an amount of molten plastic in excess of that required for molding the lens into said cavity through an aperture along the edge of said cavity when said cavity has a volume greater than said optical lens, said greater volume to assure better flow into the thinner section of said cavity and compressing said cavity such that the thickness of said cavity is decreased so as to define said optical lens blank, thereby causing a flow of molten plastic from said optical cavity back through said aperture;

whereby an optical lens free of knit lines is formed.

2. The method defined by claim 1 including the step of curing said lens blank in said cavity after said flow of molten plastic from said cavity has ceased.

3. The method defined by claim 2 wherein pressure is applied to said blank during said curing so as to prevent shrinkage-caused distortions during curing.

4. The method defined by claim 3 wherein said molten plastic comprises polycarbonate.

5. The method defined by claim 4 wherein said cavity is heated prior to said injecting of molten polycarbonate into said cavity.

6. A method for forming a thermoplastic optical lens free of knit lines in an optical lens defining cavity comprising the steps of:

injecting molten plastic into said cavity through an aperture along the edge of said cavity, expanding said cavity to a volume greater than said optical lens by the force of said injected molten plastic acting upon the surfaces defining said cavity during said injection of said molten plastic;

applying a first pressure to said surfaces defining said cavity so as to urge molten plastic to flow from said cavity back through said aperture along said edge of said cavity;

applying a second pressure to said surfaces and said molten plastic as said molten plastic cures.

7. The method of claim 6 wherein said first pressure decreases the thickness of said cavity thereby urging said molten plastic from said cavity back through said aperture, said first pressure being applied until said cavity substantially defines said optical lens.

8. The method defined by claim 6 wherein said molten plastic comprises a molten polycarbonate.

9. An apparatus for injection molding a lens comprising:

a housing;

a pair of dies disposed within said housing, said dies defining a cavity of receiving an amount of molten plastic therein, said amount being in excess of an amount of molten plastic required for molding the lens;

means within said housing for permitting the relative movement of said dies such that the volume of said cavity may be varied;

injection molding means communicating with said cavity for injecting said excess amount of plastic into said cavity said injection molding means communicating with said cavity through an inlet port;

compression means coupled to at least one of said dies for sequentially reducing the volume of said cavity and for applying pressure to said plastic in said cavity after said plastic is injected through said inlet port into said cavity causing a portion of said plastic to be transferred from said cavity back through said inlet port;

whereby molten plastic may be injected into said cavity, and then the volume of said cavity may be decreased forcing molten plastic from said cavity back through said inlet port.

10. The injection molding apparatus of claim 9 further comprising means for cutting off the flow of molten plastic into said cavity.

11. The apparatus of claim 10 wherein said means for cutting off the flow of molten plastic comprises a piston, said piston isolating the cavity from said injection molding means while in a first position, and allowing passage of molten plastic from said injection molding means to said cavity while in a second position.

12. The injection molding apparatus of claim 11 further comprising means to accommodate said molten plastic transported from said cavity back through said inlet port.

13. The injection molding apparatus of claim 10 wherein one of said pair of dies is fixed and said other die moves relative to said fixed die.

14. The injection molding apparatus of claim 13 including heating means for heating said cavity.

15. The injection molding apparatus of claim 14 wherein said other die is mounted such that when plastic is injected into said cavity, the volume of said cavity is increased by the pressure of such in-flowing molten plastic.

16. The injection molding apparatus of claim 9 further comprising means to accommodate said molten plastic transported from said cavity back through said inlet port.

17. The injection molding apparatus of claim 16 wherein one of said pair of dies is fixed and said other dies moves relative to said fixed die.

18. The injection molding apparatus of claim 17 including heating means for heating said cavity.

19. The injection molding apparatus of claim 18 wherein said other die is mounted such that when plastic is injected into said cavity, the volume of said cavity is increased by the pressure of such in-flowing molten plastic.

20. The injection molding apparatus of claim 9 wherein one of said pair of dies is fixed and the other die moves relative to said fixed die.

21. The injection molding apparatus of claim 20 including heating means for heating said cavity.

22. The injection molding apparatus of claim 21 wherein said other die is mounted such that when plastic is injected into said cavity, the volume of said cavity is increased by the pressure of such in-flowing molten plastic.

23. The injection molding apparatus of claim 12 wherein one of said pair of dies is fixed and said other die moves relative to said fixed die.

24. The injection molding apparatus of claim 23 including heating means for heating said cavity.

25. The injection molding apparatus of claim 24 wherein said other die is mounted such that when plastic is injected into said cavity, the volume of said cavity is increased by the pressure of such inflowing molten plasiic.

26. An apparatus for injection molding a lens comprising:
   a housing;
   a pair of dies disposed within said housing, said dies defining a cavity for receiving an amount of molten plastic therein, said amount being in excess of an amount of molten plastic required for molding the lens;
   means within said housing for permitting the relative movement of said dies such that the volume of said cavity may be varied;
   injection molding means communicating with said cavity for injecting said excess amount of plastic into said cavity, said injection molding means communicating with said cavity through an inlet port;
   compression means coupled to at least one of said dies for sequentially reducing the volume of said cavity and for applying pressure to said plastic in said cavity after said plastic is injected through said inlet port into said cavity causing a portion of said plastic to be transferred from said cavity back through said inlet port;
   means to accommodate said molten plastic transported from said cavity back through said inlet port, said accommodating means including:
   a spring loaded piston housed within an elongated reservoir;
   a stop means for locking said piston in a first position;
   whereby molten plastic may be injected into said cavity, and then the volume of said cavity may be decreased forcing molten plastic from said cavity back through said inlet port where when said piston is locked in said first position and pressure is applied to said piston, excess molten plastic is prevented from entering said reservoir and when said piston is released, the pressure of the excess molten plastic will depress said piston thereby filling said reservoir with molten plastic.

27. An apparatus for injection molding a lens comprising:
   a housing;
   a pair of dies disposed within said housing, said dies defining a cavity for receiving an amount of molten plastic therein, said amount being in excess of an amount of molten plastic required for molding the lens;
   means within said housing for permitting the relative movement of said dies such that the volume of said cavity may be varied;
   injection molding means communicating with said cavity for injecting said excess amount of plastic into said cavity, said injection molding means communicating with said cavity through an inlet port;
   compression means coupled to at least one of said dies for sequentially reducing the volume of said cavity and for applying pressure to said plastic in said cavity after said plastic is injected through said inlet port into said cavity causing a portion of said plastic to be transferred from said cavity back through said inlet port;
   means for cutting off the flow of molten plastic into said cavity comprising a piston for isolating the cavity from said injection molding means while in a first position, and allowing passage of molten plastic from said injection molding means to said cavity while in a second position;
   means to accommodate said molten plastic transported from said cavity back through said inlet port, said accommodating means comprising
   a second spring-loaded piston housed within an elongated reservoir; and a stop means for locking said second piston in a first position;
   whereby molten plastic may be injected into said cavity, and then the volume of said cavity may be decreased forcing molten plastic from said cavity back through said inlet port where when said piston is locked in said first position and pressure is applied to said piston, excess molten plastic is prevented from entering said reservoir and when said piston is released, the pressure of the excess molten plastic will depress said piston thereby filling said reservoir with molten plastic.

* * * * *